(12) United States Patent
Allen (10) Patent No.: US 10,012,313 B2
(45) Date of Patent: Jul. 3, 2018

(54) ASYMMETRICAL ENERGIZED SEAL ARRANGEMENT

(71) Applicant: Deere & Company, Moline, IL (US)

(72) Inventor: Kevin M. Allen, Bartlesville, OK (US)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 14/871,461

(22) Filed: Sep. 30, 2015

(65) Prior Publication Data
US 2017/0089462 A1  Mar. 30, 2017

(51) Int. Cl.
| F16D 55/18 | (2006.01) |
| F16J 15/06 | (2006.01) |
| B60T 11/10 | (2006.01) |
| F16D 65/28 | (2006.01) |
| B60T 1/06 | (2006.01) |
| F16J 15/3208 | (2016.01) |
| F16D 121/04 | (2012.01) |
| F16D 125/08 | (2012.01) |

(52) U.S. Cl.
CPC ............ *F16J 15/061* (2013.01); *B60T 1/062* (2013.01); *B60T 11/10* (2013.01); *F16D 65/28* (2013.01); *F16J 15/062* (2013.01); *F16J 15/3208* (2013.01); *F16D 2121/04* (2013.01); *F16D 2125/08* (2013.01)

(58) Field of Classification Search
CPC .... B60T 13/741; F16J 15/164; F16J 15/3216; F16J 15/3236
USPC ........................................................ 188/72.4
See application file for complete search history.

(56) References Cited

U.S. PATENT DOCUMENTS

| 3,601,419 A * | 8/1971 | Fern | F16J 15/3236 |
| | | | 277/436 |
| 3,603,603 A * | 9/1971 | Woodson | F16L 27/087 |
| | | | 277/582 |
| 3,608,913 A * | 9/1971 | D'Assignies | F16J 15/3236 |
| | | | 277/530 |

(Continued)

FOREIGN PATENT DOCUMENTS

| DE | 2829029 A1 | 1/1980 |
| DE | 102013205301 A1 | 10/2014 |

OTHER PUBLICATIONS

Masterseals International Pte Ltd, Masterseals First Class Attitude Standard Seal Product Page, Admitted Prior Art.

(Continued)

*Primary Examiner* — Anna M Momper
*Assistant Examiner* — Mahbubur Rashid
(74) *Attorney, Agent, or Firm* — Lorenz & Kopf, LLP (57) ABSTRACT

A seal arrangement includes an annular energizer backing an annual seal. The seal is disposed about a central axis and has a first seal surface extending in a radial direction, a second seal surface extending in an axial direction, and a back side opposite at least one of the first and second seal surfaces. The annular energizer is made of a resilient compressible material configured to engage the back side of the seal. The seal and the energizer are arranged concentrically about the central axis, and the energizer engages the seal asymmetrically with respect to a radial plane extending through an axial center of the seal to apply a biasing force to the seal biasing the first seal surface in a first radial direction and biasing the second seal surface in a first axial direction.

15 Claims, 6 Drawing Sheets

(56) References Cited

U.S. PATENT DOCUMENTS

| | | | | |
|---|---|---|---|---|
| 3,946,837 A * | 3/1976 | Houser | B60T 8/329 | 188/106 F |
| 4,239,244 A * | 12/1980 | Brent | F16J 15/32 | 277/468 |
| 4,410,189 A * | 10/1983 | Myers | F16J 15/3208 | 277/530 |
| 4,432,555 A * | 2/1984 | Langley | C04B 35/83 | 277/644 |
| 4,475,739 A * | 10/1984 | Nakajima | F16J 9/00 | 277/442 |
| 4,618,154 A * | 10/1986 | Freudenthal | F16J 15/3236 | 277/530 |
| 4,687,212 A * | 8/1987 | Timpson, Jr. | F16J 15/3236 | 277/556 |
| 4,893,823 A * | 1/1990 | Strouse | F16J 15/166 | 277/437 |
| 4,953,876 A * | 9/1990 | Muller | F16J 15/164 | 277/556 |
| 5,143,382 A * | 9/1992 | Maringer | F16J 15/164 | 277/584 |
| 5,211,257 A * | 5/1993 | Shuzo | B60K 17/3462 | 192/58.92 |
| 5,292,138 A * | 3/1994 | Glynn | F16J 15/164 | 277/422 |
| 5,562,294 A * | 10/1996 | Marsi | F16J 15/164 | 277/358 |
| 5,842,701 A | 12/1998 | Cawthorne et al. | | |
| 6,062,834 A * | 5/2000 | Masumoto | F04C 27/005 | 418/55.4 |
| 6,405,837 B1 * | 6/2002 | Muramoto | F16D 55/32 | 188/170 |
| 6,595,524 B1 * | 7/2003 | Zitting | F16J 15/164 | 277/436 |
| 7,188,691 B2 * | 3/2007 | Yong | E21B 10/25 | 175/371 |
| 2003/0224896 A1 * | 12/2003 | Chung | F16H 48/08 | 475/231 |
| 2007/0102888 A1 * | 5/2007 | Takahiro | F16J 15/0887 | 277/603 |
| 2008/0168615 A1 * | 7/2008 | Geelhoed | F16J 15/3208 | 15/256.5 |
| 2009/0108542 A1 * | 4/2009 | Jordan | F16J 15/3208 | 277/589 |
| 2010/0230340 A1 * | 9/2010 | Bielawski | F16J 15/166 | 210/198.2 |
| 2011/0012312 A1 * | 1/2011 | Zitting | F16J 15/164 | 277/500 |
| 2011/0140369 A1 * | 6/2011 | Lenhert | F16J 15/3216 | 277/589 |
| 2011/0227296 A1 * | 9/2011 | Baca | F16J 15/025 | 277/626 |
| 2013/0069318 A1 * | 3/2013 | Kane | F16J 15/3236 | 277/500 |
| 2014/0239598 A1 * | 8/2014 | Hisada | F16J 15/3204 | 277/394 |
| 2014/0265139 A1 * | 9/2014 | Dilmaghanian | F16J 15/3208 | 277/309 |

OTHER PUBLICATIONS

SKF Group, Rod and Buffer Seals, Rod Sealing Systems Information Page, Admitted Prior Art.
Trelleborg, Trelleborg Sealing Solutions, Zurcon Buffer Seal Product Page, Admitted Prior Art.
German Search Report for Patent Application No. 10 2016 218 254.4 dated Feb. 3, 2017.

* cited by examiner

ASYMMETRICAL ENERGIZED SEAL ARRANGEMENT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to seal arrangements, such as for sealing pressurized fluid chambers in various components.

BACKGROUND OF THE DISCLOSURE

Work vehicles of various types (e.g., agricultural tractors, loaders, and so on) may have drive axles with internal components (e.g., brake assemblies) that may be actuated by hydraulic fluid. For example, the application of hydraulic fluid under pressure to an actuator piston may drive a brake to impede or cease rotation of a drive axle. The hydraulic pressure may be applied to the piston through a sealed chamber. The dynamic seal of the piston chamber must be sufficiently robust (e.g., adequate extrusion and wear resistance) to provide proper sealing during the pressurization of the piston chamber required to actuate the piston. It may also be beneficial to adequately seal the piston chamber when unpressurized to inhibit passive leakage of the fluid from the chamber that may contribute to slowed responsiveness of the braking action. High operating pressures and temperatures common in these applications may render conventional glide seals ineffectual, or necessitate more costly, exotic material seal arrangements, which may even prove to be inadequate.

SUMMARY OF THE DISCLOSURE

This disclosure provides an energized seal arrangement, such as may be used to seal pressurized fluid chambers in various drive components.

In one aspect the disclosure provides an annular energizer and seal arrangement. The seal may be disposed about a central axis and have a first seal surface extending in a radial direction, a second seal surface extending in an axial direction, and a back side opposite at least one of the first and second seal surfaces. The annular energizer, which may be made of a resilient compressible material, is configured to engage the back side of the seal. The seal and the energizer may be arranged concentrically about the central axis, and the energizer may engage the seal asymmetrically with respect to a radial plane extending through an axial center of the seal to apply a biasing force to the seal biasing the first seal surface in a first radial direction and biasing the second seal surface in a first axial direction.

In another aspect the disclosure provides an actuator arrangement which may have a piston plate and an actuator piston movable along a stroke axis with respect to the piston plate. The piston plate and the actuator piston may form an interfitting annular ring and channel arrangement disposed about, and relatively movable with respect to, the stroke axis. A seal arrangement may have an annual seal in an annular groove formed in the ring or the channel. The seal may have a first seal surface engaging a wall of the groove, a second seal surface engaging a wall of the channel, and a back side opposite at least one of the first and second seal surfaces. An annular energizer, which may be made of a resilient compressible material, is configured to engage the back side of the seal. The seal and the energizer may be arranged concentrically about the stroke axis, and the energizer may engage the seal asymmetrically with respect to a radial plane extending through an axial center of the seal to apply a biasing force to the seal biasing the first seal surface radially toward the channel wall and biasing the second seal surface axially toward the groove wall.

In yet another aspect the disclosure provides an actuator arrangement that may have a piston plate defining an annular channel and an actuator piston have an annular ring movable along a stroke axis within the channel of the piston plate. A seal arrangement may have an annual seal in an annular groove formed in the ring or the channel. The seal may have a first seal surface engaging a wall of the groove, a second seal surface engaging a wall of the channel, and a back side opposite at least one of the first and second seal surfaces. An annular energizer, which may be made of a resilient compressible material, is configured to engage the back side of the seal. The seal and the energizer may be arranged concentrically about the stroke axis, and the energizer may engage the seal asymmetrically with respect to a radial plane extending through an axial center of the seal to apply a biasing force to the seal biasing the first seal surface radially toward the channel wall and biasing the second seal surface axially toward the groove wall. At least one of the back side of the seal and the energizer may have at least one biasing surface disposed asymmetrically with respect to the radial plane.

The details of one or more implementations or embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed energized seal arrangement, as shown in the accompanying figures of the drawings described briefly above. Various modifications to the example embodiments may be contemplated by one of skill in the art.

As noted above, the dynamic seal of a piston chamber should be sufficiently robust to withstand the high temperature and high pressure operating conditions associated with this working environment. Moreover, it may be desirable to seal the piston chamber when the piston chamber is unpressurized to inhibit or prevent passive leaking of the fluid from the piston chamber. Traditional seals may wear under the high temperatures (such as about 350 degrees Fahrenheit (F)) and high pressures (such as about 1,000 pounds per square inch (psi)) associated with the operating conditions of the piston chamber. Further, traditional seals may not adequately seal when the piston chamber is unpressurized, thereby potentially reducing performance of the piston.

The use of the disclosed asymmetrical energized seal arrangement may address these and various other issues. For example, the asymmetrical seal arrangement may include an annular energizer, which energizes or applies a biasing force to an annular seal in multiple directions: primarily an axial direction and a radial direction. By biasing the annular seal in these two directions, the annular seal may remain seated and sealed during periods when the actuator arrangement is operating and when unpressurized. Moreover, the asymmetrical seal arrangement may be composed of materials that withstand the high temperature and high pressure operating conditions associated with the actuator arrangement to enable the unique biasing force applied by the annular energizer to remain largely the same over time. The asymmetrical energized seal arrangement may also include a key feature defined in an actuator piston of the actuator assembly, which assists in biasing the annular energizer relative to the annular seal. The annular energizer of the disclosed asymmetrical seal arrangement may also be composed of a relatively low durometer material, which eases assembly of the asymmetrical energized seal arrangement while providing for additional compression of the annular energizer during operation to account for various operating conditions.

As used herein, the term "axial" refers to a direction that is generally parallel to an axis of rotation, axis of symmetry, or centerline of a component or components. For example, in a cylinder or disc with a centerline and opposite, generally circular ends or faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Figure 1:
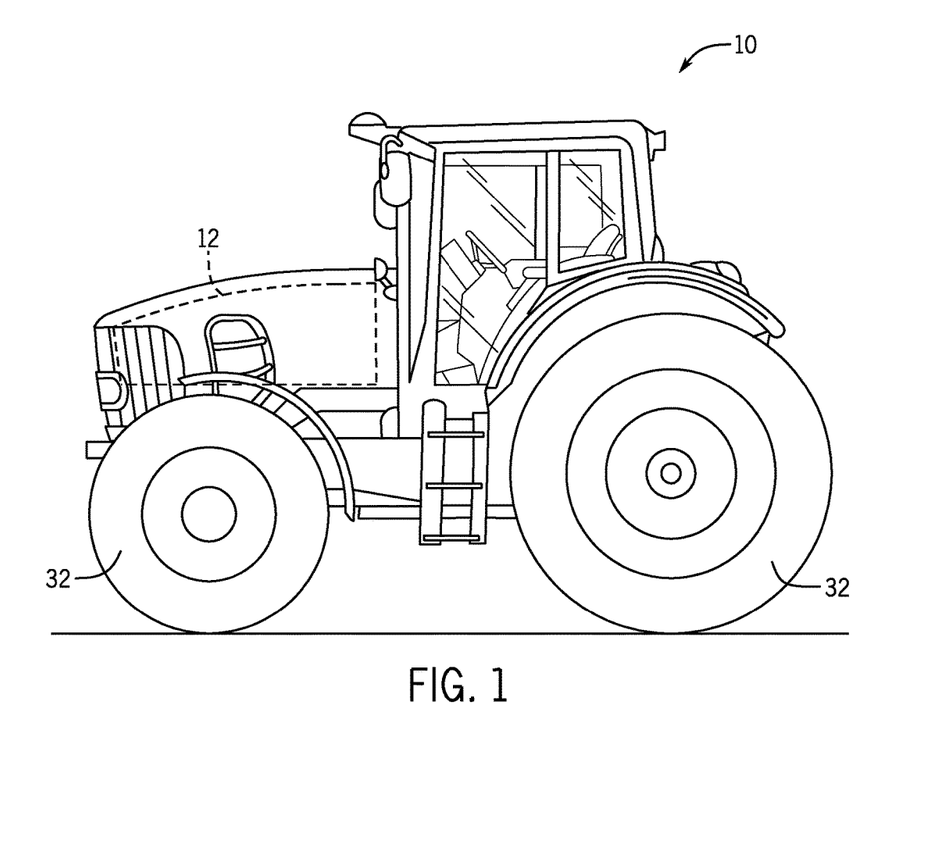
FIG. 1 is a side view of an example work vehicle in the form of an agricultural tractor in which may be implemented the disclosed asymmetrical energized seal arrangement.

Referring now to FIG. 1, an asymmetrical energized seal arrangement may be implemented with respect to a variety of vehicles (or other platforms), including, for example, a work vehicle 10. The work vehicle 10, depicted here as a tractor, may include power train components 12, which may include an engine (or other power source), a transmission, various control systems (including, for example, various computing devices such as a driveline control module), and so on. The work vehicle 10 may be configured to drive or tow various implements (e.g., harvesters, mower-conditioners, seeders, and so on) and may, in certain embodiments, be configured to provide power to external implements via a power take-off shaft (not shown) or various other power-transmitting connections (not shown).

Figure 2:
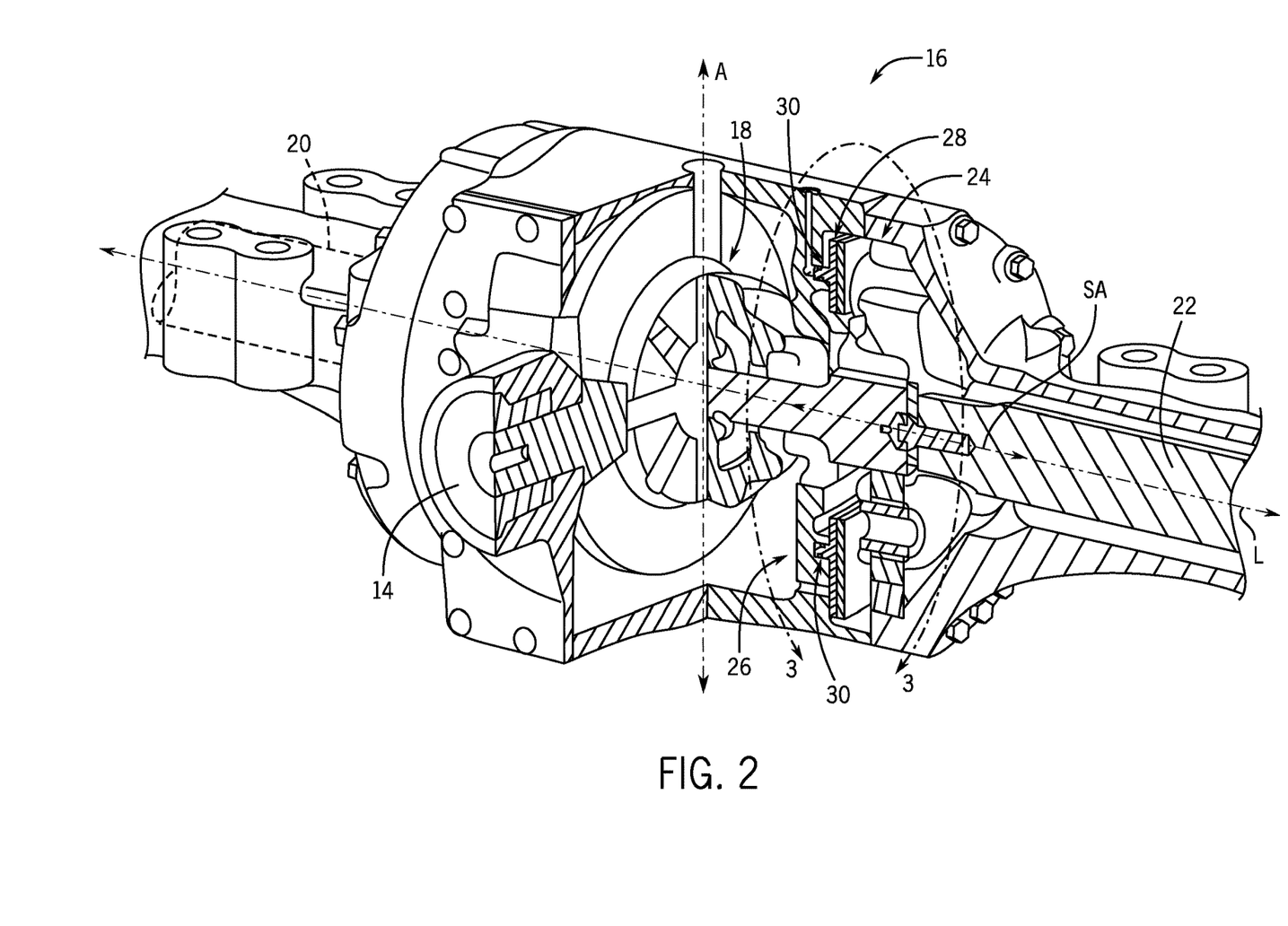
FIG. 2 is a simplified partial perspective cut-away view shown of an axle assembly for the work vehicle of FIG. 1.

Referring also to FIG. 2, and as also discussed above, the power train components 12 may include power source (e.g., an internal combustion ("IC") engine (not shown)), a transmission (not shown) and drive shafts, such as drive shaft 14. The drive shaft 14 may transmit power from the transmission to an axle assembly 16, which includes a differential 18 and drive axles 20, 22 mounting ground-engaging wheels 32 (FIG. 1). The differential 18 may include suitable gearing, which transfers the power from the drive shaft 14 to the drive axles 20, 22, respectively, to drive rotation of the wheels 32. In one example, an actuator arrangement 24 is coupled to each drive axle 20, 22. In this example, the actuator arrangement 24 may be part of a brake arrangement 34 to apply a force to impede or cease rotation of the respective drive axle 20, 22. The actuator arrangement 24 may be responsive to a fluid pressure, such as a hydraulic fluid pressure, to move or drive the brake (not shown). In one example, the actuator arrangement 24 includes a piston plate 26, an actuator piston 28 and a seal arrangement 30. As the actuator arrangement 24 is substantially symmetric with respect to central axis A of the axle assembly 16, only the actuator arrangement 24 associated with the drive axle 22 will be described herein for clarity with the understanding that the actuator arrangement 24 associated with the drive axle 20 may be the same or substantially similar.

Moreover, it will be understood that the locations and interconnections of the various components in FIG. 2 are presented as part of an example configuration and that various other configurations may be possible. For example, various actuator arrangements 24 may not be physically included in the axle assembly 16, although they may cooperate with portions of the axle assembly 16, such as the drive axles 20, 22. Similarly, the axle assembly 16 may be arranged with a number of configurations and, in certain embodiments, may represent only one of multiple axle assemblies associated with the work vehicle 10. In certain embodiments, the work vehicle 10 may include a variety of other work (or non-work) vehicles. It will be understood that aspects of this disclosure may also beneficially be implemented with respect to non-vehicle actuator arrangements that require sealing.

Figure 3:
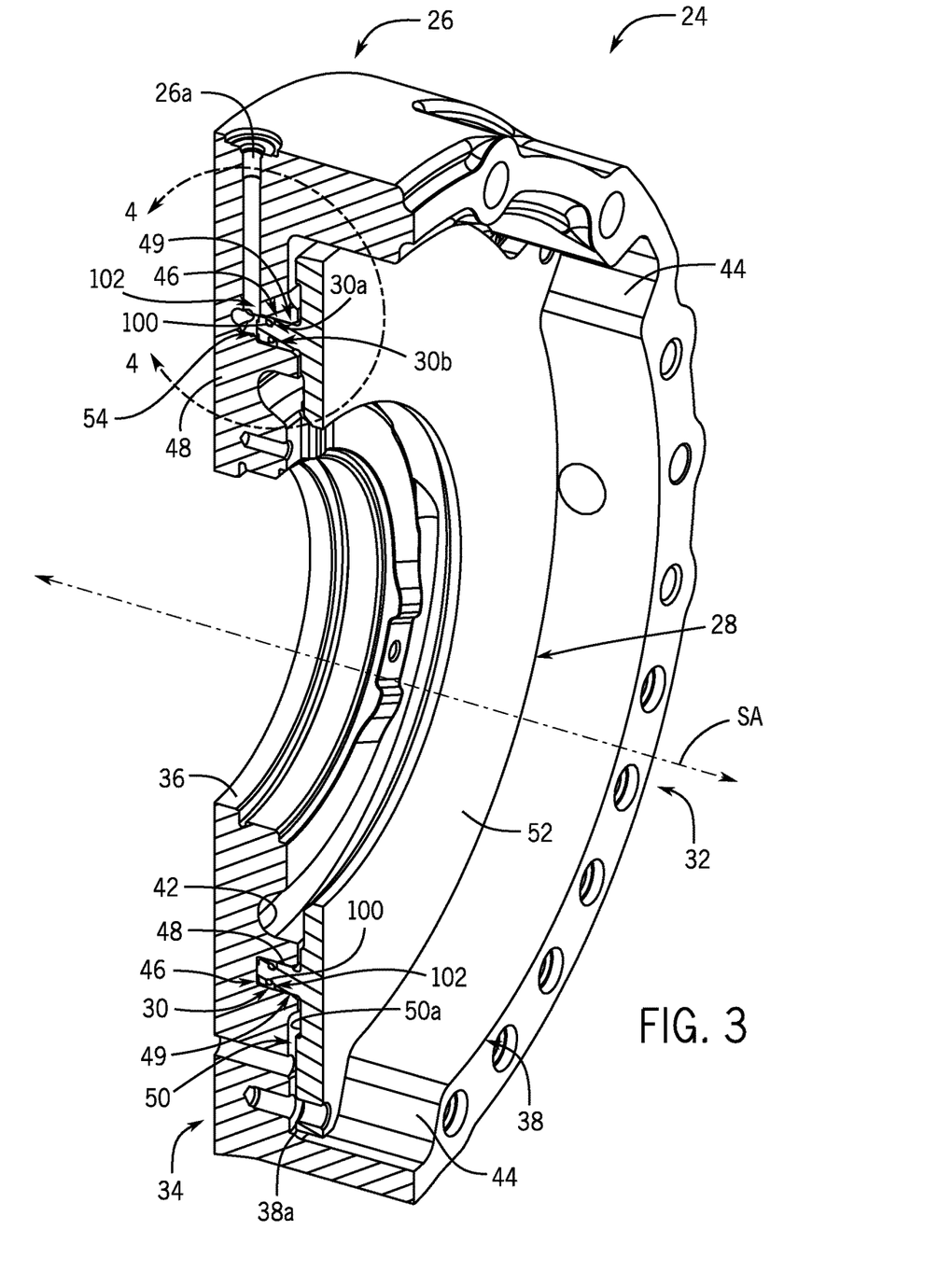
FIG. 3 is a perspective sectional view of a piston actuator arrangement associated with the axle assembly of FIG. 2, which includes an example asymmetrical energized seal arrangement according to this disclosure.

With reference to FIG. 3, the piston plate 26 is substantially annular, and includes a first side 32 and a second side 34. A throughbore 36 is defined through the first side 32 and the second side 34 to enable the respective drive axle 20, 22 to be coupled to the differential 18. The second side 34 of the piston plate 26 is substantially planar; however the second side 34 may have any desired shape. The first side 32 may have a counterbore 38, a surface 40 and a groove 42. The counterbore 38 is generally defined through the first side 32 to the surface 40 and may include one or more features, such as ramps 44 to guide the movement of the actuator piston 28 relative to the piston plate 26. It should be noted that the use of the ramps 44 to guide the movement of the actuator piston 28 is merely an example, as the piston plate 26 may define any desired cooperating feature or surface to guide the movement of the actuator piston 28 relative to the piston plate 26. The counterbore 38 generally extends about a perimeter or circumference of the piston plate 26 to define a path for the actuator piston 28.

The surface 40 generally extends between the groove 42 and a wall 38a of the counterbore 38. The surface 40 defines an annular channel 46. The annular channel 46 is defined through the surface 40 about a perimeter or circumference of the surface 40 such that the annular channel 46 generally extends substantially about an entirety of the piston plate 26. In one example, with reference to FIG. 4, the annular channel 46 has substantially parallel sidewalls 48, 49; however, the annular channel 46 may have any desired shape. One or more of the sidewalls 48, 49 may include a lead-in chamfer 48a, which aids in receiving a portion of the actuator piston 28 within the annular channel 46. It should be noted that while a single sidewall 48 is illustrated herein as including a lead-in chamfer, both of the sidewalls 48, 49 may include the lead-in chamfer. The annular channel 46 may be in communication with one or more ports 26a defined through the piston plate 26 to receive a fluid, including, but not limited to, a hydraulic fluid.

With reference to FIGS. 2 and 3, the actuator piston 28 is movable relative to the piston plate 26 along a stroke axis SA, which is substantially parallel with a longitudinal axis L of the axle assembly 16 (FIG. 2). With reference to FIG. 3, the piston plate 26 includes a head 50 and a base 52. The head 50 faces the surface 40 of the piston plate 26, with the base 52 substantially opposite the head 50. The base 52, in this example, is substantially planar. The head 50 includes an annular ring 54. The annular ring 54 extends outwardly from a surface 50a of the head 50 and is sized to be at least partially received within the annular channel 46 of the piston plate 26. In one example, the annular ring 54 fits within the annular channel 46 with a gap clearance, for example of about 150 to about 200 micrometers (μm). The annular ring 54 extends substantially about a perimeter or circumference of the surface 50a such that the annular ring 54 extends substantially about an entirety of the head 50.

Figure 4:
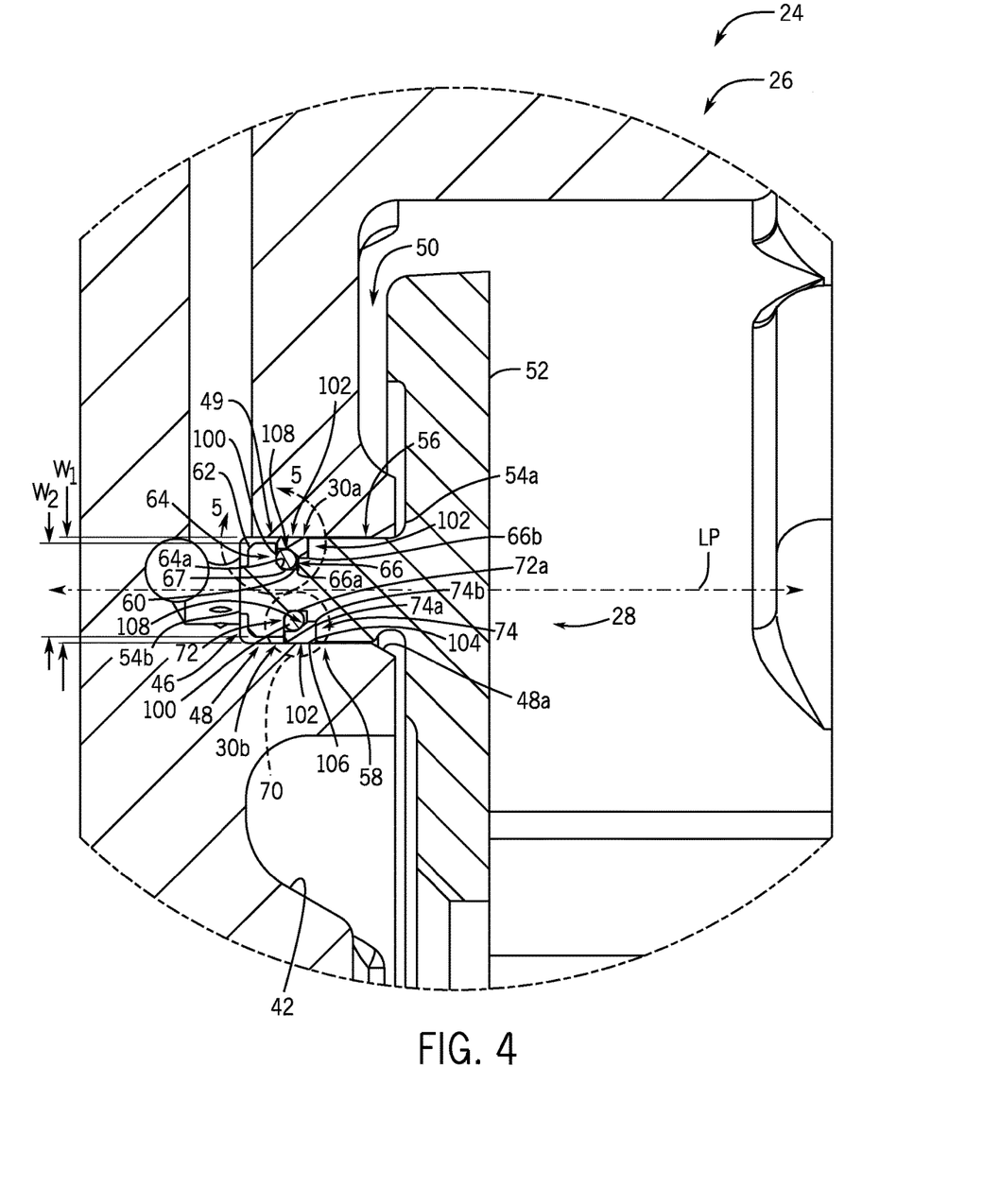
FIG. 4 is an enlarged detail view of the area 4-4 of FIG. 3.
Figure 5:
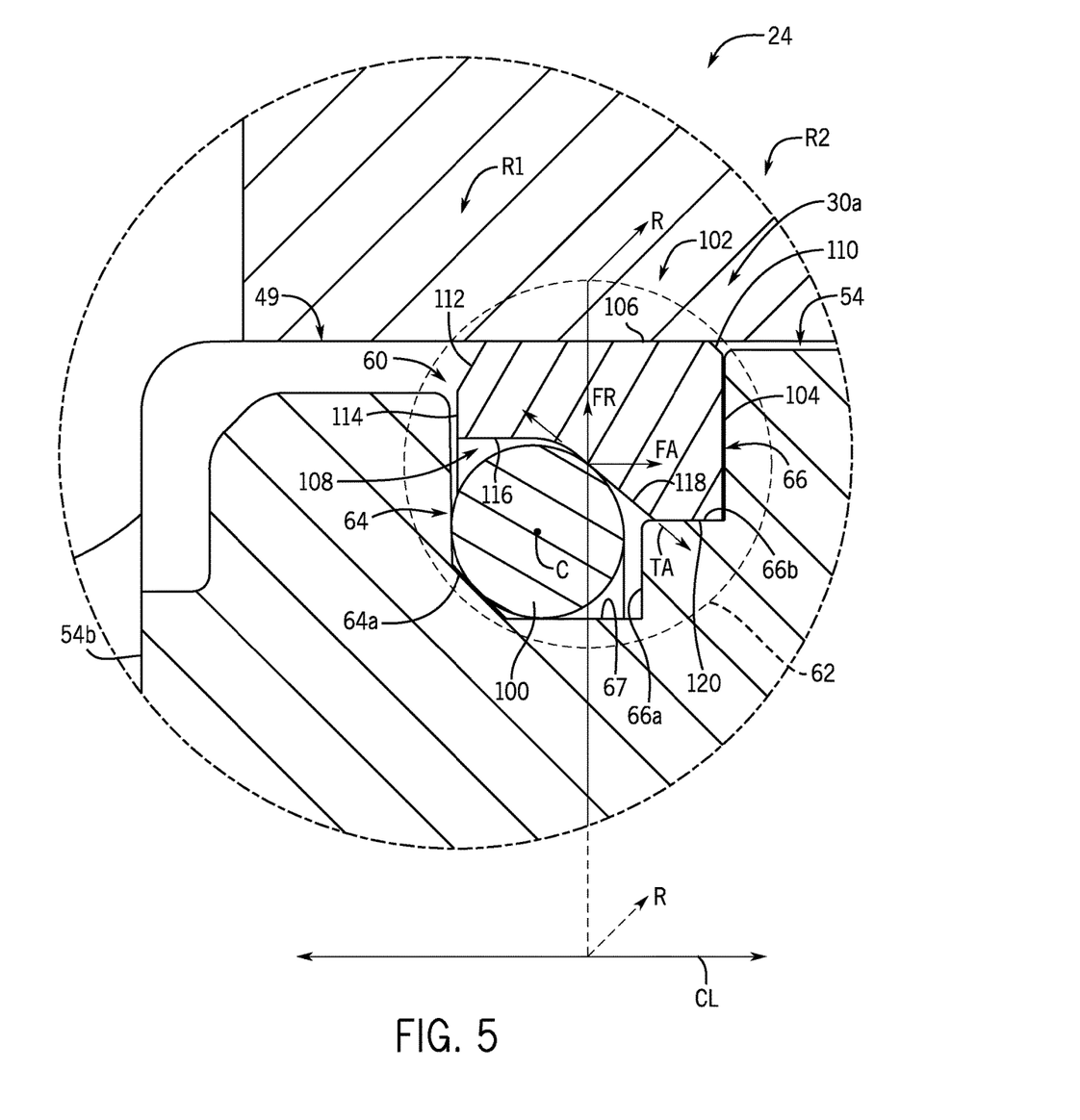
FIG. 5 is an enlarged detail view of the area 5-5 of FIG. 4.

With reference to FIG. 4, the annular ring 54 includes a first surface 56 and a second surface 58, which extend from a root 54a to a tip 54b of the annular ring 54. The first surface 56 is spaced apart from the second surface 58 along a diameter of the annular ring 54. The first surface 56 is positioned adjacent to the sidewall 49 of the annular channel 46 and the second surface 58 is positioned adjacent to the sidewall 48 of the annular channel 46 when the annular ring 54 is received within the annular channel 46. In one example, the first surface 56 defines a first annular recess 60. The first annular recess 60 cooperates with the sidewall 49 of the annular channel 46 to define a first annular groove generally labeled as 62 for receipt of the seal arrangement 30. The first annular recess 60 includes a first wall 64 spaced apart from a second wall 66 and coupled together via a surface 67. The first wall 64 includes a chamfered surface 64a adjacent to the surface 67. The first wall 64 and the chamfered surface 64a contact a portion of the seal arrangement 30 to orientate the seal arrangement 30 within the first annular recess 60. Generally, the chamfered surface 64a has an oblique surface extending obliquely with respect to a radial plane R defined through an axial center AC of the annular seal 102 (FIG. 5).

In certain embodiments, the second wall 66 may include a key feature 66a and a shelf or raised portion 66b. The second wall 66, the key feature 66a and the raised portion 66b contact a portion of the seal arrangement 30 to orientate the seal arrangement 30 within the first annular recess 60. The surface 67 forms a bottom surface of the first annular recess 60. It should be noted that one or more of the chamfered surface 64a, the key feature 66a and the raised portion 66b may be eliminated or shaped differently within the first annular recess 60 to assist in orientating the seal arrangement 30 within the first annular recess 60.

The second surface 58 defines a second annular recess 68. The second annular recess 68 is generally defined so as to be offset from the first annular recess 60 along a longitudinal axis LR of the annular ring 54. The offset between the first annular recess 60 and the second annular recess 68 enables a single seal arrangement 30 to start into the annular channel 46 at a time, which may reduce wear or damage to the seal arrangement 30 and reduce the force required to assemble the actuator piston 28 to the piston plate 26. The second annular recess 68 cooperates with the sidewall 48 of the annular channel 46 to define a second annular groove generally labeled as 70 for receipt of the seal arrangement 30. The second annular recess 68 includes a first wall 72 spaced apart from a second wall 74 and coupled together via a surface 76. The first wall 72 includes a chamfered surface 72a adjacent to the surface 76. The first wall 72 and the chamfered surface 72a contact a portion of the seal arrangement 30 to orientate the seal arrangement 30 within the second annular recess 68. Generally, the chamfered surface 72a has an oblique surface extending obliquely with respect to the radial plane R.

In certain embodiments, the second wall 74 may include a key feature 74a and a raised portion 74b. The key feature 74a and the raised portion 74b contact a portion of the seal arrangement 30 to orientate the seal arrangement 30 within the second annular recess 68. The surface 76 forms a bottom surface of the second annular recess 68. It should be noted that one or more of the chamfered surface 72a, the key feature 74a and the raised portion 74b may be eliminated or shaped differently within the second annular recess 68 to assist in orientating the seal arrangement 30 within the second annular recess 68.

The root 54a of the annular ring 54 is adjacent, and coupled, to the surface 50a of the head 50. The tip 54b forms a distalmost end of the annular ring 54. Generally, the first annular recess 60 is defined in greater proximity to the tip 54b along an axial length of the annular ring 54 than the second annular recess 68. In one example, the annular ring 54 has a first width W1 at the root 54a, and a second width W2 at the tip 54b. The first width W1 may be different than the second width W2, and in one example, the first width W1 is greater than the second width W2 to assist in the movement of the annular ring 54 within the annular channel 46.

The seal arrangement 30 is received within each of the first annular groove 62 and the second annular groove 70. In this regard, the actuator arrangement 24 generally includes two seal arrangements 30, a first seal arrangement 30a received within the first annular groove 62 and a second seal arrangement 30b received within the second annular groove 70. The first seal arrangement 30a and the second seal arrangement 30b are generally symmetric with respect to the longitudinal axis LP of the annular ring 54. Each of the first and second 30b seal arrangements include an annular energizer 100 and an annular seal 102. With reference to FIG. 3, the annular energizer 100 and the annular seal 102 of each of the first and second 30b seal arrangements are disposed concentrically about the stroke axis SA. As the first seal arrangement 30a may be the same or substantially similar to the second seal arrangement 30b, only the first seal arrangement 30a will be discussed in detail below.

The annular energizer 100 provides a biasing force against the annular seal 102 to energize the annular seal 102. Generally, with reference to FIG. 5, the annular energizer 100 maintains a radial force FR and an axial force FA against the annular seal 102 to seal along the annular channel 46 during various operating conditions associated with the actuator arrangement 24. The use of the annular energizer 100 also reduces or prevents passive leakage about the annular ring 54 when fluid pressure is reduced.

In one example, the annular energizer 100 is made of a resilient compressible material, such as a Viton® synthetic rubber and fluoropolymer elastomer commercially available from E. I. du Pont de Nemours and Company of Delaware, USA. It should be noted that while the annular energizer 100 is described herein as comprising a polymeric material, the annular energizer 100 may comprise a metal spring, such as a garter spring, Belleville washer, etc. In one embodiment, the annular energizer 100 has a low durometer such that the annular energizer 100 acts as a soft spring while applying the biasing force to the annular seal 102. By acting as a soft spring, the annular energizer 100 reduces the force required to assemble the actuator piston 28 to the piston plate 26, and allows for additional compression of the annular energizer 100 during operation of the actuator arrangement 24.

The annular energizer 100 is received within the first annular groove 62 such that the annular energizer 100 contacts the first wall 64, the chamfered surface 64a and the surface 67. The chamfered surface 64a assists in biasing the annular energizer 100 against the annular seal 102, and the key feature 66a locates a center C of the annular energizer 100 to an opposite side of the radial plane R. In this regard, as the key feature 66a is located to a first axial side R1 of the radial plane R, the key feature 66a locates the center C of the annular energizer 100 to an opposite, second axial side R2 of the radial plane R. The chamfered surface 64a acts as a biasing surface for biasing the annular energizer 100 towards the second axial side R2 of the radial plane R.

Figure 6:
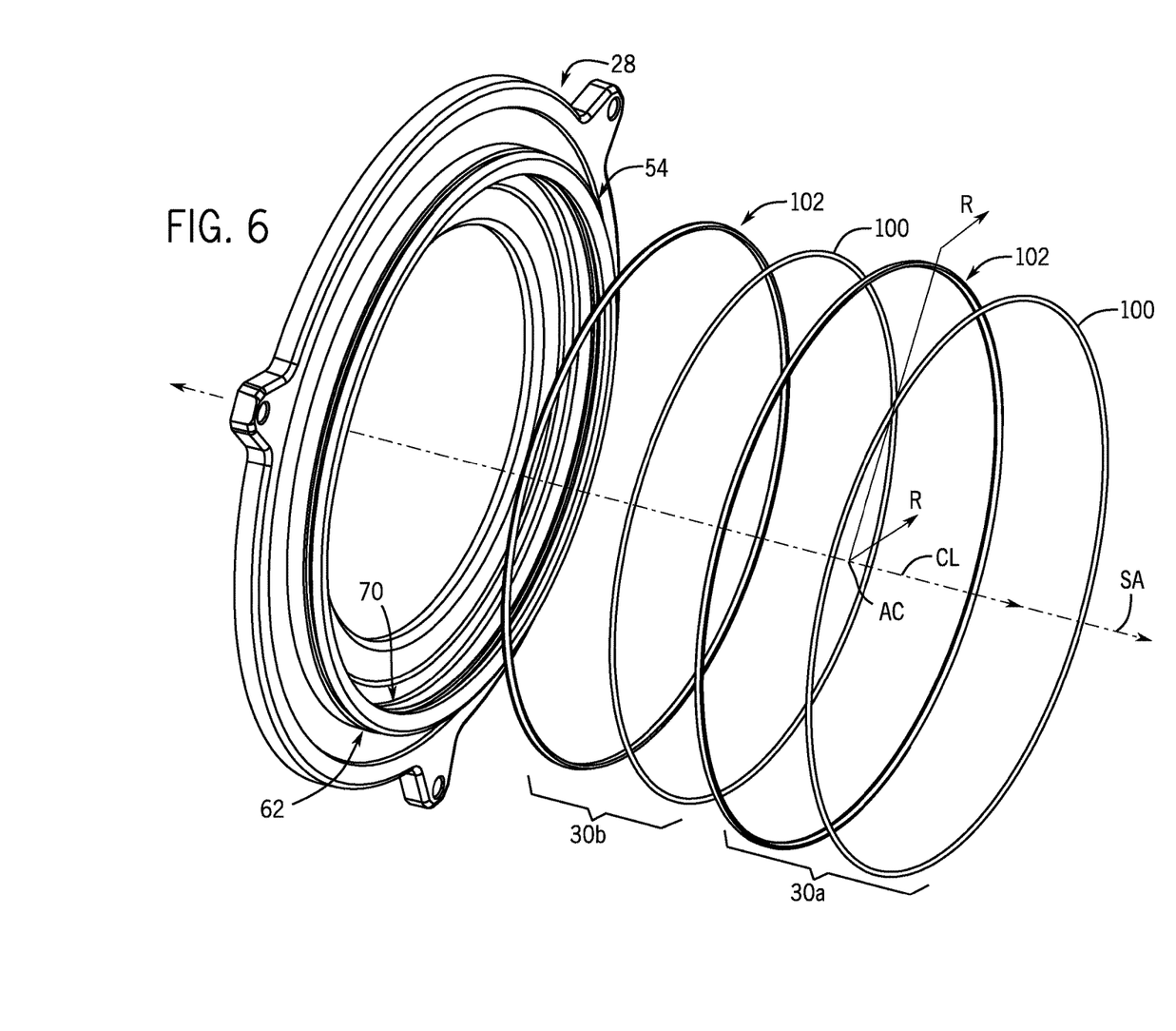
FIG. 6 is an exploded view of the actuator piston and the asymmetrical energized seal arrangement shown in FIG. 3.

Generally, the annular energizer 100 has a substantially circular or O-shaped radial cross-section, such as an O-ring, however; it will be understood that the annular energizer 100 may have any suitable radial cross-section to apply a compressive force to the annular seal 102. For example, the annular energizer 100 may have an X-shaped radial cross-section, similar to a quad-seal, or the cross-section of the annular energizer 100 may include one or more flat surfaces to facilitate the assembly of the annular energizer 100 within the first annular groove 62. As a further example, the annular energizer 100 may include one or more oblique surfaces, which are arranged so as to be oblique to the radial plane R defined through an axial center AC of the annular seal 102. The annular energizer 100 is formed and configured to be received within the first annular groove 62 so as to extend about an entirety of the annular ring 54, as illustrated in FIG. 6.

With reference to FIG. 5, the annular seal 102 seals against the annular channel 46. Generally, the annular seal 102 is received within the first annular groove 62 and is coupled to the annular energizer 100 so as to receive the biasing force from the annular energizer 100. In various embodiments, the annular seal 102 may be composed of a polymeric material, including, but not limited to, a hydrogenated nitrile butadiene rubber (HNBR). The annular seal 102 is generally asymmetric with respect to the radial plane R defined through the axial center AC (see FIG. 6) of the annular seal 102. The asymmetric shape of the annular seal 102 enables the annular energizer 100 engage the annular seal 102 asymmetrically with respect to the radial plane R to apply a biasing force to the annular seal 102 in two directions, namely, a radial direction and an axial direction. In one example, the annular seal 102 includes a first seal surface 104, a second seal surface 106 and a third surface, or back side, 108. The annular seal 102 is disposed about a central axis or centerline CL (see FIG. 6).

With reference to FIG. 5, the first seal surface 104 is coupled to or engages the second wall 66 of the first annular recess 60 when the first seal arrangement 30a is coupled to the first annular groove 62. In one example, the first seal surface 104 is substantially planar or flat, such that the first seal surface 104 fully contacts the second wall 66 to provide surface to surface contact. The first seal surface 104 extends in a radial direction with respect to the central axis or centerline CL of the annular seal 102. The first seal surface 104 is connected to the second seal surface 106 via a chamfered surface 110.

The second seal surface 106 is coupled to or engages the sidewall 49 of the annular channel 46 when the first seal arrangement 30a is coupled to the first annular groove 62. In one example, the second seal surface 106 is substantially planar or flat, such that the second seal surface 106 fully contacts the sidewall 49 to provide surface to surface contact. The second seal surface 106 extends in an axial direction with respect to the central axis or centerline CL of the annular seal 102. The second seal surface 106 is connected to the back side 108 via a first inclined surface 112 and a planar surface 114.

The back side 108 includes a first surface 116, a biasing or second surface 118 and a third surface 120. The back side 108 is generally opposite at least one of or both of the first seal surface 104 and the second seal surface 106. The first surface 116 is coupled to the planar surface 114 and the second surface 118. The first surface 116 extends substantially parallel to the second seal surface 106. The first surface 116 extends for a length less than a length of the second seal surface 106. Generally, the first surface 116 includes an axial surface adjacent to the second surface 118 at a radial distance farther from the central axis or centerline CL than the second surface 118.

The second surface 118 is oblique or angled and is coupled between the first surface 116 and the third surface 120. In one example, the second surface 118 extends so as to be oblique with respect to the radial plane RA. The second surface 118 also generally extends along an axis TA transverse to the radial plane RA. The second surface 118 extends such that the axis TA defined along the second surface 118 is transverse to an axis defined along the first surface 116 and an axis defined along the third surface 120. The second surface 118 is also substantially asymmetric with respect to the radial plane RA. The second surface 118 is coupled to or engages with the annular energizer 100 to receive the biasing force. As the second surface 118 is oblique, the biasing force received from the annular energizer 100 is distributed in both the axial direction and the radial direction such that the first seal surface 104 is biased to seal against the second wall 66 of the first annular groove 62 and the second seal surface 106 is biased to seal against the sidewall 49 of the annular channel 46.

The third surface 120 is coupled to and contacts the raised portion 66b of the second wall 66 when the annular seal 102 is received within the first annular groove 62. The third surface 120 extends substantially parallel to raised portion 66b to provide surface to surface contact between the third surface 120 and the raised portion 66b. The third surface 120 is substantially planar or flat.

In order to assemble the actuator piston 28 to the piston plate 26, in one example, the annular energizer 100 of the first seal arrangement 30a is positioned within the first annular recess 60 such that the annular energizer 100 contacts the chamfered surface 64a. The key feature 66a locates the center of the annular energizer 100 to an opposite second axial side of the radial plane RA. The annular seal 102 is positioned within the first annular recess 60 over the annular energizer 100 such that the first seal surface 104 contacts the second wall 66 of the first annular recess 60 and the third surface 120 of the back side 108 contacts the raised portion 66b. With reference to FIG. 4, the annular energizer 100 of the second seal arrangement 30b is positioned within the second annular recess 68 such that the annular energizer 100 contacts the chamfered surface 72a. The annular seal 102 is positioned within the second annular recess 68 over the annular energizer 100 such that the first seal surface 104 contacts the second wall 74 of the second annular recess 68 and the back side 108 contacts the raised portion 74b.

With the first seal arrangement 30a and the second seal arrangement 30b coupled to the annular channel 46 of the actuator piston 28, the actuator piston 28 may be coupled to the piston plate 26. The actuator piston 28 is coupled to the piston plate 26 such that the annular ring 54 fits within the annular channel 46. The positioning of the annular ring 54 within the annular channel 46 compresses the annular energizer 100. The compression of the annular energizer 100 generates the biasing force. With reference to FIG. 5, due to the oblique second surface 118 of the back side 108, the biasing force from the annular energizer 100 is directed in a radial direction (radial force FR) to seal the second seal surface 106 against the sidewall 49 of the annular channel 46 and an axial direction (axial force FA) to seal the first seal surface 104 against the second wall 66 of the annular channel 46. The radial direction of the radial force FR is radially outward from the central axis CL. Similarly, the biasing force of the annular energizer 100 associated with the second seal arrangement 30b is directed in a radial direction to seal the second seal surface 106 against the sidewall 48 of the annular channel 46 and an axial direction to seal the first seal surface 104 against the second wall 74 of the annular channel 46. Thus, the seal arrangements 30a, 30b seal against both the annular channel 46 and the annular ring 54 and remain energized without the application of fluid pressure to prevent or eliminate passive leakage. When pressurized by a hydraulic fluid, the hydraulic fluid acts to seat the seal arrangements 30a, 30b against the annular channel 46 and the respective one of the first annular groove 62 and the second annular groove 70. In this regard, with reference to FIG. 4, the hydraulic fluid may enter through port 26a and apply a fluid force FF against the seal arrangements 30a, 30b, thereby biasing the annular seals 102 of each of the seal arrangements 30a, 30b in the direction of the fluid force FF against the annular channel 46 and the respective one of the first annular groove 62 and the second annular groove 70.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A seal arrangement for sealing a groove in a piston component, comprising:
    an annular seal disposed about a central axis, the seal having a first seal surface extending in a radial direction with respect to the central axis, a second seal surface extending in an axial direction with respect the central axis, and a back side opposite at least one of the first and second seal surfaces; and
    an annular energizer made of a resilient compressible material and configured to engage the back side of the seal;
    wherein the seal and the energizer are arranged concentrically about the central axis and the energizer engages the seal asymmetrically with respect to a radial plane extending through an axial center of the seal to apply a biasing force to the seal biasing the first seal surface in a first radial direction and biasing the second seal surface in a first axial direction; and
    wherein the back side of the seal includes at least one biasing surface including an obliquely angled surface extending obliquely with respect to and intersected by the radial plane;
    wherein the back side of the seal includes an axial surface adjacent to the oblique surface at each side of the radial plane;
    wherein the groove includes a key feature located to a first axial side of the radial plane locating a center of the energizer to an opposite second axial side of the radial plane; and
    wherein the groove includes a biasing surface at the second axial side of the radial plane defined by an oblique surface extending obliquely with respect to the radial plane.

2. The seal arrangement of claim 1, wherein the at least one biasing surface at the back side of the seal is disposed asymmetrically with respect to the radial plane.

3. The seal arrangement of claim 1, wherein one of the axial surfaces adjacent to the oblique surface is at a radial distance further from the centerline than the oblique surface.

4. The seal arrangement of claim 1, wherein the energizer has a circular radial cross-section.

5. The seal arrangement of claim 1, wherein the first radial direction is radially outward from the central axis.

6. An actuator arrangement, comprising:
    a piston plate;
    an actuator piston movable along a stroke axis with respect to the piston plate, the piston plate and the actuator piston forming an interfitting annular ring and channel arrangement disposed about and relatively movable with respect to the stroke axis; and a seal arrangement, including:

an annular seal in an annular groove formed in one of the ring and the channel, the seal having a first seal surface engaging a wall of the groove and a second seal surface engaging a wall of the channel, the seal having a back side opposite at least one of the first and second seal surfaces; and an annular energizer made of a resilient compressible material and configured to engage the back side of the seal;

wherein the seal and the energizer are arranged concentrically about the stroke axis and the energizer engages the seal asymmetrically with respect to a radial plane extending through an axial center of the seal to apply a biasing force to the seal biasing the first seal surface radially toward the channel wall and biasing the second seal surface axially toward the groove wall;

wherein the groove includes a key feature located to a first axial side of the radial plane locating a center of the energizer to an opposite second axial side of the radial plane; and wherein the groove includes a biasing surface at the second axial side of the radial plane defined by an oblique surface extending obliquely with respect to the radial plane.

7. The actuator arrangement of claim 6, wherein the back side of the seal has at least one biasing surface disposed asymmetrically with respect to the radial plane.

8. The actuator arrangement of claim 7, wherein the at least one biasing surface includes an oblique surface extending obliquely with respect to the radial plane.

9. The actuator arrangement of claim 8, wherein the back side of the seal includes an axial surface adjacent to the oblique surface at a radial distance farther from the centerline than the oblique surface.

10. The actuator arrangement of claim 6, further including a second seal arrangement; and wherein one of the ring and the channel defines a second annular groove in which the second seal arrangement is disposed concentrically about the stroke axis with the seal arrangement.

11. The actuator arrangement of claim 6, wherein the actuator piston defines the ring and piston plate defines the channel.

12. An actuator arrangement, comprising:

a piston plate defining an annular channel;

an actuator piston movable along a stroke axis with respect to the piston plate, the actuator piston having an annular ring movable within the channel of the piston plate; and a seal arrangement, including:

an annular seal in an annular groove formed in one of the ring and the channel, the seal having a first seal surface engaging a wall of the groove and a second seal surface engaging a wall of the channel, the seal having a back side opposite at least one of the first and second seal surfaces; and an annular energizer made of a resilient compressible material and configured to engage the back side of the seal;

wherein the seal and the energizer are arranged concentrically about the stroke axis and the energizer engages the seal asymmetrically with respect to a radial plane extending through an axial center of the seal to apply a biasing force to the seal biasing the first seal surface radially toward the channel wall and biasing the second seal surface axially toward the groove wall;

wherein the back side of the seal has at least one biasing surface disposed asymmetrically with respect to the radial plane;

wherein the groove includes a key feature located to a first axial side of the radial plane locating a center of the energizer to an opposite second axial side of the radial plane; and wherein the groove includes a biasing surface at the second axial side of the radial plane defined by an oblique surface extending obliquely with respect to the radial plane.

13. The actuator arrangement of claim 12, wherein the at least one biasing surface includes an oblique surface extending obliquely with respect to the radial plane.

14. The actuator arrangement of claim 13, wherein the back side of the seal includes an axial surface adjacent to the oblique surface at a radial distance further from the centerline than the oblique surface.

15. The actuator arrangement of claim 13, wherein the energizer has a circular radial cross-section.

* * * * *

UNITED STATES PATENT AND TRADEMARK OFFICE
CERTIFICATE OF CORRECTION

| | | |
|---|---|---|
| PATENT NO. | : 10,012,313 B2 | Page 1 of 1 |
| APPLICATION NO. | : 14/871461 | |
| DATED | : July 3, 2018 | |
| INVENTOR(S) | : Kevin M. Allen | |

It is certified that error appears in the above-identified patent and that said Letters Patent is hereby corrected as shown below:

In the Claims

Column 10, Claim 1, Line 26, after "respect" insert -- to --.

Column 10, Claim 3, Line 59, delete "further" and insert -- farther --, therefor.

Column 12, Claim 14, Line 43, delete "further" and insert -- farther --, therefor.

Signed and Sealed this
Eleventh Day of December, 2018

Andrei Iancu
*Director of the United States Patent and Trademark Office*